United States Patent [19]

Kobayashi et al.

[11] 3,930,564
[45] Jan. 6, 1976

[54] DISC BRAKES FOR VEHICLES

[75] Inventors: Toyoaki Kobayashi, Toyohashi; Yoshinori Mori, Toyoda, both of Japan

[73] Assignee: Aisin Seiki Kabushiki Kaisha, Kariya, Japan

[22] Filed: Apr. 11, 1973

[21] Appl. No.: 350,190

Related U.S. Application Data

[63] Continuation of Ser. No. 143,031, May 13, 1971, abandoned.

[30] Foreign Application Priority Data

May 15, 1970   Japan........................ 45-047517[U]
May 15, 1970   Japan........................ 45-047518[U]

[52] U.S. Cl. .............. 188/73.3; 188/72.4; 188/73.6
[51] Int. Cl.² .......................................... F16D 65/02
[58] Field of Search ........ 188/73.3, 72.4, 72.5, 370, 188/73.6

[56] References Cited

UNITED STATES PATENTS

| 3,310,135 | 3/1967 | Wells | 188/73.6 |
| 3,621,946 | 11/1971 | Mori | 188/73.6 |
| 3,656,589 | 4/1972 | Kawabe | 188/72.5 |
| 3,661,232 | 5/1972 | Kondo | 188/73.6 |
| 3,724,606 | 4/1973 | Kobayashi | 188/72.5 |
| R26,746 | 12/1969 | Hayes | 188/72.4 |

*Primary Examiner*—Trygve M. Blix
*Assistant Examiner*—Charles E. Frankfort
*Attorney, Agent, or Firm*—Pierce, Scheffler & Parker

[57] ABSTRACT

A disc brake for use on automotive vehicles comprising a hydraulic cylinder housing located on one side of a rotatable brake disc, wherein a rigid stationary member has at each side a torque taking arm for absorbing the brake torque created on friction pads during brake application, said torque taking arm being extended above and across the brake disc as straight as a rail at the other side of the disc.

5 Claims, 10 Drawing Figures

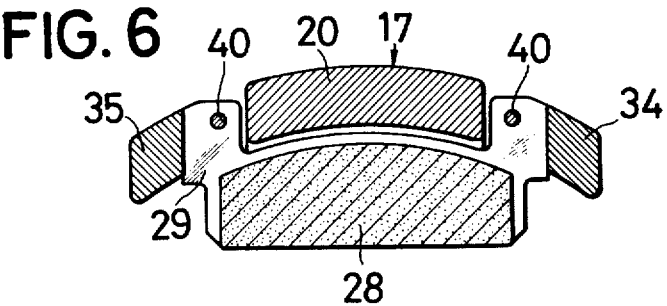
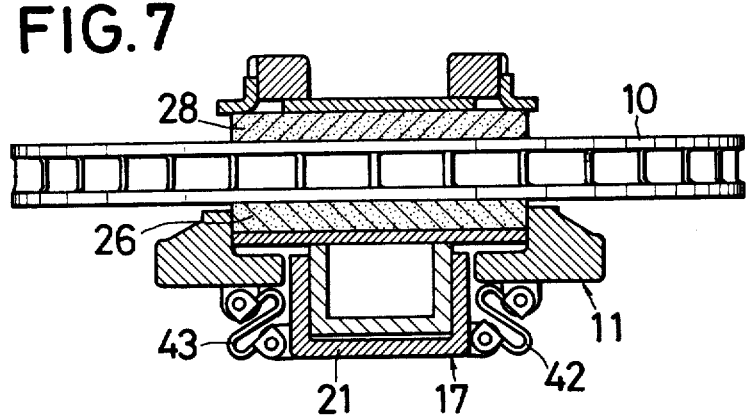
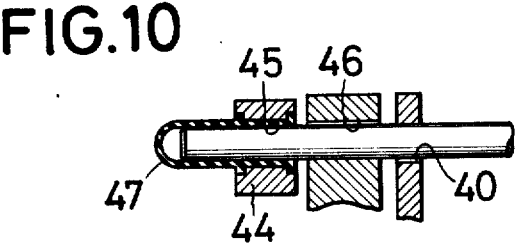

DISC BRAKES FOR VEHICLES

This is a continuation of application Ser. No. 143,031, filed May 13, 1971 and now abandoned.

This invention relates to hydraulic spot disc brakes for vehicles, more particularly to the disc brakes of the kind in which friction pads are adapted to be urged by hydraulic means into engagement with opposite faces of a rotatable disc.

It is required to detach the brake disc from the wheel assembly, for instance upon examination of the front wheel axle on which the brake disc is mounted. However, in the conventional disc brakes it is difficult to meet the above requirement. In addition, it is desired that the friction pads are allowed to cool as soon as the brake application is released, the said friction pads being heated by frictional engagement with the rotating disc during the brake application.

Therefore, an object of this invention is to provide a disc brake in which a brake disc can be readily detached from the wheel assembly.

Another object of this invention is to provide a disc brake in which the friction pads are allowed to cool soon after the brake application.

A further object of this invention is to provide a disc brake in which a reaction transfer member which will transmit the reaction on one friction pad to the other friction pad is reliably guided.

A still further object of this invention is to provide a disc brake which is simple in structure and economical in manufacture.

Other objects and features of the invention will become apparent from a consideration of the following description which proceeds with reference to the accompanying drawings, wherein:

FIG. 6 is a sectional view taken along the line 6—6 of FIG. 1;

FIG. 7 is a view similar to FIG. 4 but showing a first modification of guiding means for a clamping member;

FIG. 10 is a fragmentary section taken along the line 10—10 of FIG. 8.

Figure 1:
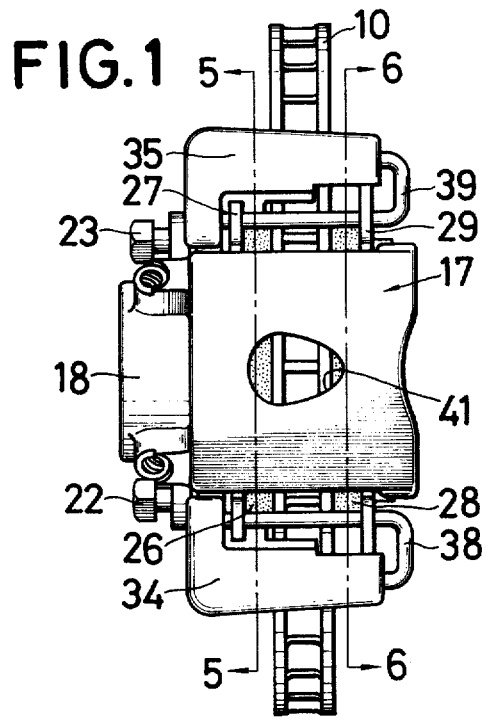
FIG. 1 is a plan view of a disc brake according to the invention.
Figure 2:
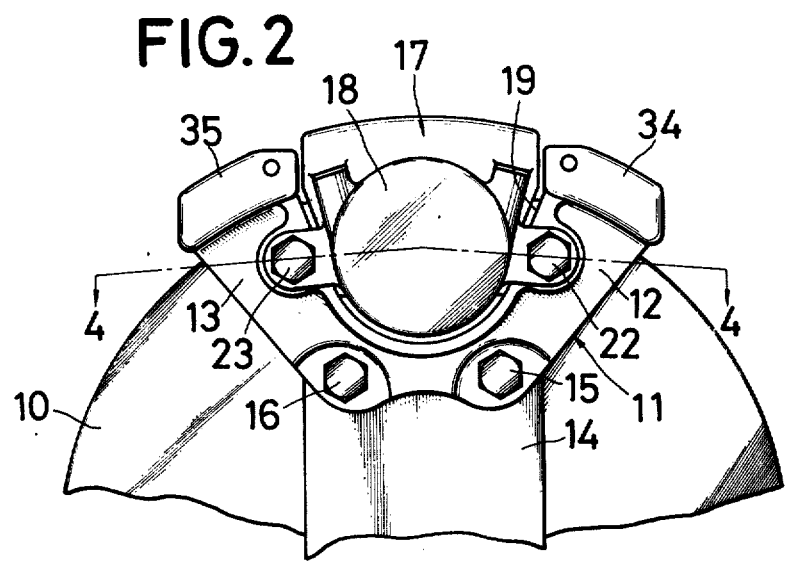
FIG. 2 is a front elevational view of FIG. 1.
Figure 3:
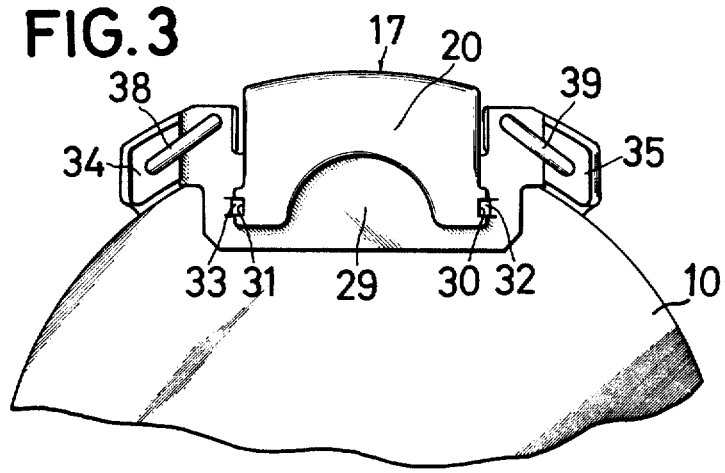
FIG. 3 is a back elevational view of FIG. 1.
Figure 4:
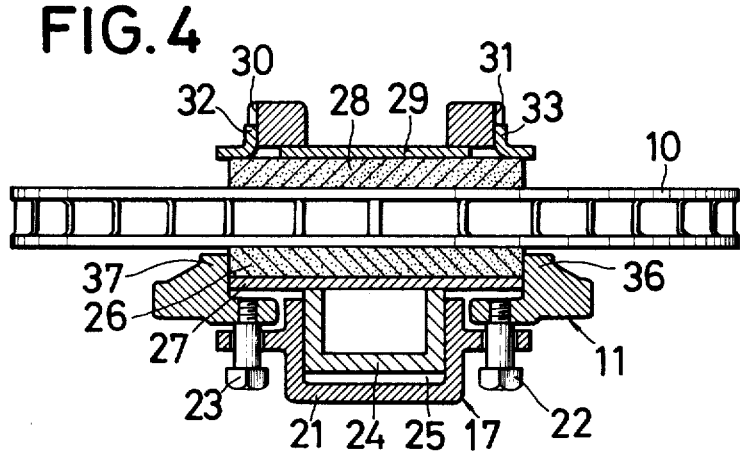
FIG. 4 is a sectional view taken along the line 4—4 of FIG. 2.
Figure 5:
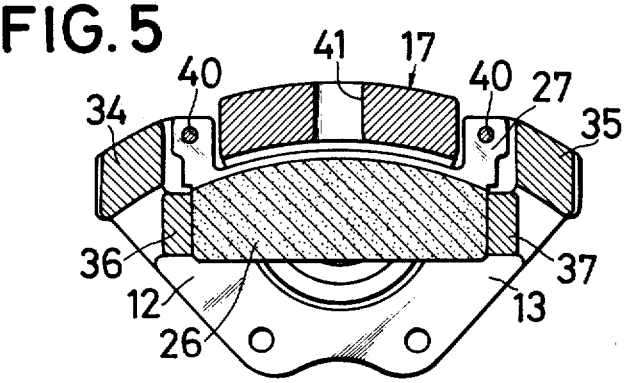
FIG. 5 is a sectional view taken along the line 5—5 of FIG. 1.

In the brake illustrated in FIGS. 1 to 6, the numeral 10 denotes a disc secured to a rotatable hub (not shown) adapted to carry a road wheel (not shown). A torque taking member 11 comprising offset limbs 12 and 13 confronting one surface of the disc 10 is fixed to a stationary member 14 of the vehicle by fixing bolts 15 and 16. A clamping or reaction transfer member 17 of a U-shaped casting or forging is received at one limb 18 in a radial recess 19 formed between the offset limbs 12 and 13 and straddles the outer periphery of the disc 10, and the other limb 20 is disposed in a substantially parallel relation with the other surface of the disc 10. An elongated through hole 41 (FIGS. 1 and 5) is formed on the caliper member 17 at its head portion. A hydraulic cylinder housing 21 opened at end is formed in the limb 18 and is slidably supported on the torque taking member 11 by guiding bolts 22 and 23, each bolt being fixed to the torque taking member at one end and loosely mounted on the cylinder housing at the other end. A piston 24 is slidingly and sealingly fitted within the bore of the cylinder housing 21 to constitute a fluid chamber 25 to which fluid under pressure is supplied upon brake applications.

A first friction pad 26 bonded to a rigid backing plate 27 is located at one side of the disc 10 and engaged with the piston 24, while a second friction pad 28 bonded to a rigid backing plate 29 is located at the other side of the disc 10 and engaged with the other limb 20 of the clamping member 17, the limb 20 being provided with a pair of elongated slots 30 and 31 in which a pair of projections 32 and 33 of the backing plate 29 is received, respectively, thereby preventing outward movement of the clamping member 17 relative to the backing plate 29. The clamping member 17 is free to move axially, so that when fluid under pressure is forced into the fluid chamber 25 the piston 24 applies the first pad 26 to one face of the disc 10 and the reaction on the clamping member 17 moves it axially to bring the second pad 28 into engagement with the other face of the disc 10.

The torque taking member 11 includes a pair of parallel arms 34 and 35 which extend above and across the outer periphery of the disc 10 from the offset limbs 12 and 13 integral therewith, respectively, the said clamping member 17 and the friction pads 26 and 28 being positioned between the spaced arms 34 and 35. It will be seen that the torque taking arms 34 and 35 include inner protuberances 36 and 37, respectively, for sliding engagement with the first friction pad 26 on one side of the disc, and that the arms extend in a straddling manner over the disc 10 in a straight line and have no downward projections at the other side of the disc, the side edge of the backing plate 29 being in sliding engagement with the inner parallel surfaces of the arms 34 and 35.

A pair of substantially J-shaped guide pins 38 and 39 is provided in parallel relation to each other for preventing the radial movement of the friction pads 26 and 28 together with the backing plates 27 and 29. Each of the guide pins passes through holes 40 provided on the backing plates 27 and 29 and is secured at each end thereof to the respective torque taking arms.

When the brake is applied, the rotating disc 10 is squeezed by the opposite pads 26 and 28 as described above. The torque created on the pads is taken by each of the parallel arms 34 and 35 mounted on the stationary member 14 of the vehicle so that no brake torque will be transmitted to the clamping member 17. When necessary, the disc 10 may be readily detached from the wheel assembly after the parallel pins 38 and 39, the second pad 28, and the caliper member 17 have been removed since the torque taking arms 34 and 35 have no downward projections which will obstruct the axial movement of the disc. In addition, according to this structure the heat generated on the friction pads will be more dissipated.

In FIG. 7, there is illustrated a modified form of the guiding bolts for the clamping member 17. According to this embodiment, a pair of resilient straps 42 and 43 are used for guiding the clamping member 17 in place of the guiding bolts 22 and 23 of the previous embodiment. Each strap of substantially S-shape is pivotally mounted at its ends to the torque taking member 11 and the cylinder member 21 thereby permitting the latter member to move relative to the former member in the axial direction of the brake disc 10. The non-elastical deformation of the straps 42 and 43 will compensate for wear on the opposite friction pads 26 and 28.

Figure 8:
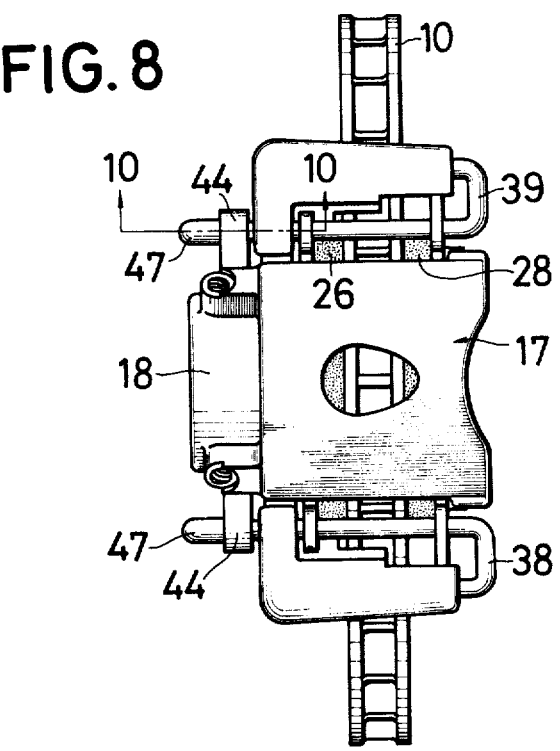
FIG. 8 is a view similar to FIG. 1 but showing a second modification of guiding means for a clamping member.
Figure 9:
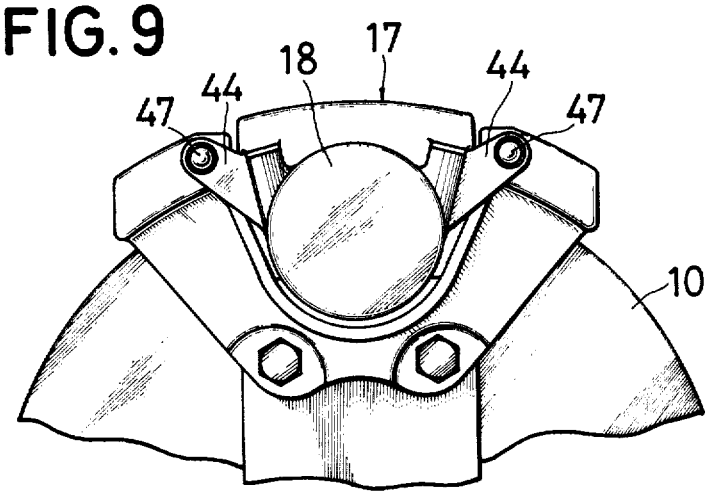
FIG. 9 is a front elevational view of FIG. 8.

In FIGS. 8 to 10, a second modification of the guiding bolts is shown in which a pair of guide pins 38 and 39 for the friction pads 26 and 28 will function as guiding means for the clamping member 17. The one limb 18 of the clamping member 17 includes a pair of radially offset flanges 44 provided with holes 45, each hole 45 being formed coaxially with a through hole 46 of each torque taking arm and the hole 40 of each backing plate. Each of the parallel pins 38 and 39 is axially slidably fitted in the hole 45 of the flange 44 through a rubber bush 47 securely inserted within the hole 45 and formed into a cap shape.

The other arrangements of this embodiment is substantially the same as those of the foregoing embodiments so that the detailed explanation thereof will be omitted.

When hydraulic pressure is supplied into the fluid chamber (not shown), the first friction pad 26 is engaged with the brake disc 10. At the same time, the clamping member 17 is moved to the left in FIG. 8 to permit the frictional engagement of the second pad 28 with the disc, said clamping member being axially guided by the parallel pins 38 and 39.

What is claimed is:
1. A disc brake comprising: in combination:
 a rotatable disc;
 a rigid stationary member comprising a pair of torque taking arms extending above and across the periphery of said rotatable disc and forming an opening therebetween, the extended portions of the torque taking arms being entirely disposed outside of the periphery of said rotatable disc, and the inner portions of the torque taking arms having protuberances disposed inside the periphery of said rotatable disc;
 a cylinder housing located on one side of said disc;
 piston means slidably fitted in said cylinder housing;
 a pair of backing plates having friction pads fixed thereto and disposed on opposite sides of said disc;
 one of said backing plates and friction pads located on one side of said disc slidably engaging the protuberances of the inner portion of said pair of torque taking arms at opposite sides thereof, whereby the brake torque on said friction pad is absorbed by said torque taking arms only inside the periphery of said disc during braking;
 the other of said backing plates and friction pad being located on the other side of said disc, over which side the said extended portions of said torque taking arms are disposed;
 the said other backing plate having at its opposite sides integrally projecting edges slidably engaging inside surfaces of the extended portions of said torque taking arms, whereby the brake torque on the friction pad fixed to said other backing plate, during braking, is directly absorbed by said torque taking arms only outside the periphery of said rotatable disc;
 a reaction transfer member fixed to said cylinder housing and extended over and across the periphery of said disc for bringing the said other friction pad into frictional engagement with said disc upon brake application and;
 a pair of parallel pins for guiding and supporting said backing plates and friction pads, both ends of said pins being fixed to the torque taking arms.

2. A disc braking according to claim 1 wherein said cylinder housing is formed on said reaction transfer member which is formed into a substantially U-shape.

3. A disc brake according to claim 2 wherein one end of each of said parallel pins is secured to said torque taking arm and its other end is loosely mounted on said reaction transfer member thereby permitting said reaction transfer member to slide axially thereon upon the brake application.

4. A disc brake according to claim 2 wherein there is provided a pair of guiding bolts at radially each side of said cylinder housing, each bolt being fixed to said stationary member at its one end and being loosely mounted on said cylinder housing at its other end.

5. A disc brake according to claim 2 wherein there is provided a pair of substantially S-shape resilient straps, each strap being mounted on said stationary member and said reaction transfer member at the radially each side of said cylinder housing.

* * * * *